United States Patent [19]

Borri et al.

[11] Patent Number: 5,277,969
[45] Date of Patent: Jan. 11, 1994

[54] LAMINATE MATERIAL HAVING A MICROFIBROUS POLYURETHANIC BASE SHEET AND PROCESS FOR ITS PREPARATION

[75] Inventors: Carlo Borri, Florence; Alessandro Piermattei, Sassoferrato; Luigi Serpe, Torre Del Greco, all of Italy

[73] Assignee: Alcantara S.p.A., Milan, Italy

[21] Appl. No.: 997,100

[22] Filed: Dec. 29, 1992

[30] Foreign Application Priority Data

Oct. 7, 1992 [IT] Italy .......................... MI92 A 2309

[51] Int. Cl.⁵ .................................................. B32B 7/00
[52] U.S. Cl. ........................... 428/252; 156/62.2; 156/167; 156/242; 156/279; 156/283; 156/290; 156/308.2; 428/220; 428/246; 428/253; 428/280; 428/282; 428/284; 428/287; 428/297; 428/298; 428/300; 428/296; 428/304.4; 428/423.1; 428/423.5; 428/423.7; 428/903; 428/904; 428/904.4; 428/920; 428/402
[58] Field of Search .............. 428/280, 282, 246, 903, 428/297, 298, 904, 904.4, 287, 220, 300, 423.1, 423.5, 423.7, 253, 252, 304.4, 296, 920, 402; 156/242, 279, 167, 62.2, 283, 308.2, 290

[56] References Cited

U.S. PATENT DOCUMENTS

| | | | |
|---|---|---|---|
| 3,531,368 | 9/1970 | Okamoto et al. | 428/374 |
| 4,663,222 | 5/1987 | Ohue et al. | 428/903 |
| 4,868,032 | 9/1989 | Elan et al. | 428/903 |
| 5,036,551 | 8/1991 | Dailey et al. | 428/903 |
| 5,073,436 | 12/1991 | Antonacci et al. | 428/903 |

Primary Examiner—James J. Bell
Attorney, Agent, or Firm—George P. Hoare, Jr.

[57] ABSTRACT

An imitation leather laminate material comprises a base sheet consisting of 50 to 90% by weight of a microfiber felt wherein said microfibers are polyethylene terephthalate or polyamide 6 or polyamide 6—6 of from 0.05 to 0.4 denier, and 50 to 10% by weight of a polyurethane-polyurea polymer having an average molecular weight corresponding to a polymer solution viscosity within the range from 10,000 to 50,000 centipoise (cps) when the solution is 25% by weight in dimethylformamide at a temperature of 20° C.; the resulting base sheet has final weight within 140 to 450 g/m² and density within 0.20 to 0.40 g/cm³ and is backed with one or more functional substrates adhered thereto.

38 Claims, No Drawings

LAMINATE MATERIAL HAVING A MICROFIBROUS POLYURETHANIC BASE SHEET AND PROCESS FOR ITS PREPARATION

FIELD OF THE INVENTION

The present invention relates to a novel laminated material comprising a microfibrous polyurethanic base sheet coupled with a functional substrate.

BACKGROUND OF THE INVENTION

Microfibrous polyurethane sheets are known in the art as leather substitutes having good properties of softness and crease and, in the case of the abraded surface type, also of smoothness and suede or velours-like touch. Examples of such products and of their preparation are disclosed e.g. in U.S. Pat. Nos. 3,531,368 and 3,889,292 and in UK patent N. 1,329,710.

These known leather substitutes have been extensively used in the field of clothing. However these products have many drawbacks when used in other fields such as trimming in autovehicles and furniture, where their mechanical properties make them unsuitable for this application.

In the art it is known, e.g. in italian patent applications No. 21457-B/89 and No. 21457-B/89, the basic idea of improving the microfibrous imitation leather properties by forming a laminate of the base sheet and one or more functional substrates.

By functional substrate is meant a separately prepared substrate such as knitted or woven fabric, expanded polymer foam, waterproofing films, paper, etcetera. More than one substrate may be adhered to the same base sheet of imitation leather.

While the idea looked easy to implement, serious problems were encountered in order to meet the physical requirements of most demanding uses, such as trim covers for autovehicles. These problems led to modify the composition of the base sheet, and eventually to substitute polyurethane with other elastomers, e.g. chloroprene rubber, acrylic rubber etc., according to the end use of the laminated material.

OBJECTS OF THE INVENTION

It is an object of the present invention to solve above cited problems and to provide an imitation leather microfibrous polyurethanic base sheet that is suitable for any kind of laminated material, independently of its end use.

It is a further object of the invention to provide a process for the preparation of a laminated material having such a multi-purpose microfibrous polyurethanic base sheet.

BRIEF SUMMARY OF THE INVENTION

According to the present invention, there is provided a laminate material having a microfibrous polyurethanic base sheet backed with a functional substrate, wherein said polyurethanic base sheet comprises 50 to 90% by weight of a polyester or polyamide microfiber felt of from 0.05 to 0.80 denier. The other complementary component of the base sheet, i.e. the polyurethanic polymer, is 10 to 50% by weight of the base sheet and is a polyurethanic polymer having polyurethane and polyurea bonds and average molecular weight corresponding to a polymer solution viscosity within the range from 10,000 to 50,000 centipoise (cps) when the solution is 25% by weight in dimethylformamide at a temperature of 20° C. The resulting base sheet has final weight within 140 to 450 g/cm² and density within 0.20 to 0.40 g/cm³.

The laminate trimming material according to this invention is prepared through a process comprising the steps of: preparing a felt of polyester or polyamide microfibers of from 0.05 to 0.80 denier, preparing a solution of a polyurethane-polyurea polymer having an average molecular weight corresponding to a polymer solution viscosity within the range from 10,000 to 50,000 centipoise (cps) when the solution is 25% by weight in dimethylformamide at a temperature of 20° C., impregnating said felt with said polyurethane-polyurea polymer to such an extent as to obtain, after coagulating and drying steps, a polyurethanic base sheet containing from 50 to 90% by weight of said felt and from 10 to 50% by weight of said polyurethane-polyurea polymer and final weight within 140 to 450 g/m² and density within 0.20 to 0.40 g/cm³, and bonding the polyurethanic base sheet thus obtained with a functional substrate comprising one or more substrate materials.

The peculiar combination of microfiber felt and of the polyurethane-polyurea polymer above disclosed provides an imitation leather base that is suitable for any kind of laminated material, even those to be used in demanding and severe conditions such as those met in autovehicle trimming.

Furthermore, the invention provides specific laminated materials having outstanding performances in their specific uses. An example of these materials is the laminated imitation leather wherein the base sheet is coupled with a woven fabric consisting of mixed cotton and polyethylene terephthalate fibers in a ratio cotton/PET within the range from 30/70 to 45/55. This laminated autovehicles seats where the substrate is a woven fabric autovehicles seats were the substrate is a woven fabric. When the laminated material has to be provided with flame retarding or fireproofing properties, the use of the invention base sheet compensate the otherwise inevitable loss of softness and/or mechanical properties resulting from known techniques involving backside coating of base sheet with a fire retarded composition.

According to a preferred aspect of the invention, fire retarded laminate material are comprising a base sheet as above disclosed, wherein the felt microfibers are obtained from a copolymer of polyethylene terephthalate and a glycol of formula

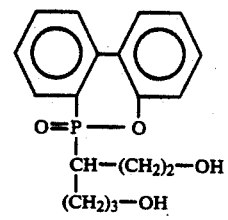

This and other examples and aspects of the invention will be hereinafter disclosed.

DETAILED DESCRIPTION OF THE INVENTION

According to a preferred embodiment of the present invention, microfibers used for preparation of the felt are polyethylene terephthalate or polyamide 6 or polyamide 6—6. These fibers are preferably of from 0.05 to 0.4 denier.

The felt is prepared according to any suitable method known in the art, e.g. as disclosed in U.S. Pat. Nos. 3,562,374 and 3,706,613 here enclosed by reference.

The polyurethanic polymer has average molecular weight corresponding to a polymer solution viscosity within the range from 10,000 to 50,000 and preferably from 15,000 to 30,000 centipoise (cps) when the solution is 25% by weight in dimethylformamide at a temperature of 20° C.

The resulting base sheet has final weight within 140 to 450 g/m² and density within 0.20 to 0.40 g/cm³.

Preferred weight is from 180 to 260 g/cm² and preferred density from 0.200 to 0.300 g/cm³.

Most preferably, said polyurethanic polymer is the reaction product obtained by reacting 3-isocyanate methyl3,5,5-trimethylcyclohexyl isocyanate, or a diisocyanate of formula

OCN—R—CH₂—R—NCO where R is a benzene or cyclohexane group, with a mixture of polyester glycols and polyesters glycols having an average molecular weight of from 1900 to 2100; and by extending the resulting prepolymer by reaction with a chain extender.

Suitable chain extenders are aromatic amines such as 4,4'-diamine diphenylmethane or aliphatic diamines such as 4,4'-diamine dicyclohexylmethane.

A preferred chain extender is water. It was found that the use of water as a chain extender provides the base sheet with an increased softness and an improved touch to such an extent as to compensate most of the loss of those properties occurring upon backing of the base sheet with the required functional substrates.

Preferred polyester glycols are polycaprolactone glycol (PCL), polytetrametylene adipate glycol (PTMAG) and polyethylene and polypropylene adipate glycols (PEAG and PPAG respectively), and preferred polyethers are polyoxytetramethylene glycol (PTHF) and polyoxy ethylene and propylene glycols (PEG and PPG respectively). The polyether glycol/polyester glycol ratio in the glycols mixture is within 1/4 to 4/1 and most preferably of about 3/1.

The water used to react with prepolymer to extend the polymer chain is provided in a molar ratio water/-glycols within 1.50 to 1.71 and most preferably within 1.57 to 1.65. The reaction is carried out at a temperature within 30° to 80° C.

In following example II, preparation of a base sheet by reaction with water is disclosed. A more detailed disclosure of the preparation of a polyurethane-polyurea polymer solution by extension reaction with water is recited in Italian patent application No. MI92-A-001945 filed Aug. 6, 1992 in the name of Alcantara S. p. A. and herein enclosed by reference.

The functional substrate to be adhered to the base sheet is depending on the end use of resulting laminated material. Consequently, also bonding means may vary according to the kind of substrate material.

A first kind of substrate is woven or knitted fabric. This substrate material is used in order to give the base sheet improved mechanical properties for use as trim cover on autovehicles seats and on furniture (chairs, sofas, etc.). It has been found that outstanding performances are obtained when the woven fabric is composed by mixed cotton and polyester fibers in a ratio of from 55 to 75 parts of polyester fibers and 30 to 45 parts of cotton fibers. Alternatively, when a knitted fabric is required, i.e. when the trim cover has to be more yielding, a nylon knitted fabric gives the best results.

When the laminate material has to be provided with fireproof or flame retarding properties, this is obtained by using the above disclosed copolymer of polyethylene terephthalate with a glycol of formula

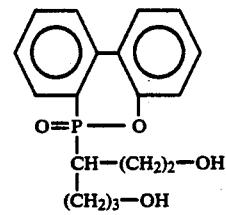

as polymer for the microfiber felt.

This copolymer is commercially available, e.g. from the firm Enichem in Acerra (Italy) under the trade name FIDION SR. The same or others flame retarded copolymers, e.g. those produced by Hoechst (Germany) may be used to obtain knitted or woven fabrics to be adhered to the base sheet according to the invention, besides or alternatively to use of above disclosed flame retarded felt.

When the felt is obtained according to the method disclosed in above cited US patents, the flame retarded copolymer is preferably coextruded with a styrene polymer or copolymer having the following properties: relative viscosity 1.78±0.03, max. moisture 400 ppm, softening point 87° C., weight density 1.05, apparent density 0.65, rest angle 32.

The felt is needle punched to obtain a felt weight and density according to the invention, and this styrene matrix is thereafter dissolved in the usual way, i.e. after impregnation with polyvinyl alcohol.

The invention will now be further disclosed with reference to the following examples.

EXAMPLE I

A polyethylene terephthalate microfiber felt was prepared according to known techniques in the following way. Fibers were coextruded with a content of about 57 parts by weight of polyethylene terephthalate, 40 parts of polystyrene copolymer and 3 parts of polyethylene glycol, the latter being included within the styrene matrix. The extruded fiber was about 3.8 denier and had 16 PET microfibers in the styrene matrix, said microfibers being about 0.10–0.11 denier, drawing ratio 2.5/1, 5 crimps/cm, 51 mm length. The fiber was needle punched to obtain an intermediate felt of fibers having a density of 0.195 g/cm³ and a weight of 540 g/m².

This intermediate felt was then immersed in a 20% water solution of polyvinyl alcohol, dried and treated with perchloroethylene to dissolve the polystyrene matrix and obtain a microfiber felt still comprising polyvinyl alcohol.

Separately a polyurethanic solution was prepared reacting 2 moles of 4,4'-diphenylmethane diisocyanate and 1 mole of a mixture of PTHF (molecular weight 1976) and PCL (molecular weight 1958) in a molar ratio of 3/1 at 65° C. for 3 hours. The thus obtained prepolymer was dissolved in dimethylformamide to obtain a 25% solution (by weight). A 25% (by weight) solution of 0.825 moles of 4,4'-diaminodiphenylmethane and 0.175 moles of n-dibutylamine in dimethylformamide (DMF) was prepared and added to the prepolymer solution at a temperature of 65° C. The mixture was reacted for 30 hours until a 25% by weight solution free of NCO groups was obtained. The resulting polyurethane-polyurea polymer had an average molecular weight corresponding to a polymer solution viscosity of about 20,000 centipoise (cps) at a temperature of 20° C. (i.e. to a calculated m.w. of about 22,000).

The polyurethanic solution was diluted with DMF to have a 13% solution by weight, the felt was then immersed in above cited solution, the excess of solution removed by expression and the impregnated felt coagulated in water to remove polyvinyl alcohol and obtain a sheet that after drying contains 68±3% by weight of microfiber felt and 32±3% of polyurethanic polymer.

This sheet was longitudinally cut to a thickness of 1 mm and subsequently abraded to obtain the suede touch.

The thus obtained base sheet properties are recited in table I.

EXAMPLE II

The same steps of example I are carried out, but for the use of a 25% (by weight) DMF solution of 1.65 moles of water as chain extender. This solution contains 0.175 moles of n-dibutylamine, is prepared and added to the prepolymer solution at a temperature of 65° C., and is reacted for 6 hours upon which the reaction is complete. The resulting polyurethane-polyurea polymer has an average molecular weight corresponding to a polymer solution viscosity of about 20,000 centipoise (cps) when the solution is 25% by weight in dimethylformamide at a temperature of 20° C. (i.e. a calculated MW of about 22,000).

The final base sheet properties are recited in table I.

EXAMPLE III

The same steps as in Example I were followed, but the microfiber felt was prepared from the above disclosed flame retarded copolymer of polyethylene terephthalate sold under trade name FIDION SR.

The mechanical and flame retarding properties of the resulting base sheet are recited in table I.

EXAMPLE IV

A woven fabric of 65/35 polyester/cotton fiber with weight of about 60 g/m² was adhered by means of thermobonding powder (polyester or polyamide powders such as e.g. Grilltex by EMS—Switzerland) to a base sheet as obtained according to example I.

The mechanical properties of the resulting laminated sheet are recited in table I.

EXAMPLE V

A flame retarded polyester woven fabric was coupled by means of thermobonding powder to a base sheet according to example II. The base sheet is previously backside coated with a flame retarded mixture comprising halogen, P and Sb compounds. These mixtures are known in the art.

The mechanical and flame retarding properties of the resulting laminated sheet are recited in table I.

EXAMPLE VI

A knitted fabric 100% nylon was adhered by means of a thermobonding foam layer 1.0 mm thick to a base sheet according to example II. The mechanical properties of the resulting laminated sheet are recited in table I.

EXAMPLE VII

A 100% flame retarded polyester fabric was adhered by means of thermobonding powder to a base sheet according to example III. The mechanical and flame retarding properties of the resulting laminated sheet are recited in table I.

EXAMPLE VIII

A polyurethane foam layer 4 mm thick and having a density of 22 Kg/m³ is flame bonded to a base sheet according to example I. The mechanical properties of the resulting laminated sheet are recited in table I.

EXAMPLE IX

A flame retarded polyurethane foam layer 4 mm thick and having a density of 22 Kg/m³ is flame bonded to a base sheet according to example I, previously backside coated with known flame retarding mixtures. The mechanical and flame retarding properties of the resulting laminated sheet are recited in table I.

EXAMPLE X

A laminated sheet according to example VIII is obtained except in that the base sheet is a flame retarding sheet according to example III and the polyurethane foam is flame retarded. The mechanical and flame retarding properties of the resulting laminated sheet are recited in table I.

EXAMPLE XI

To a laminated material according to example IV a polyurethane foam 10 mm thick and having a density of 30 Kg/m³ is flame bonded, to the thus resulting laminate a 100% nylon knitted fabric is bonded through thermobonding powders. The mechanical properties of the resulting laminated sheet are recited in table I.

EXAMPLE XII

A laminated material according to example XI is obtained but for the use of a 4 mm thick polyurethane foam and of a knitted polyethylene terephthalate fabric. The mechanical properties of the resulting laminated sheet are recited in table I.

EXAMPLE XIII

To a laminated material according to example II a micropore waterproofing polyurethane film is glue bonded. The waterproofing film is manufactured by the firm Baxenden (UK). The mechanical properties of the resulting laminated sheet are recited in table I.

EXAMPLE XIV

To a base sheet according to example I a polyurethane foam 1.5 mm thick was adhered by means of an electrobonding film. The mechanical properties of the resulting laminated sheet are recited in table I.

TABLE I

| Example | I | II | III | IV | V | VI | VII | VIII | IX | X | XI | XII | XIII | XIV |
|---|---|---|---|---|---|---|---|---|---|---|---|---|---|---|
| Thickness mm | 0.80 | 0.81 | 0.79 | 1.0 | 1.1 | 0.9 | 0.82 | 3.5 | 3.5 | 3.5 | 9.5 | 3.8 | 0.81 | 1.1 |

TABLE I-continued

| Example | | I | II | III | IV | V | VI | VII | VIII | IX | X | XI | XII | XIII | XIV |
|---|---|---|---|---|---|---|---|---|---|---|---|---|---|---|---|
| ASTM-D1910 | | | | | | | | | | | | | | | |
| Weigh g/m² | | 230 | 225 | 240 | 410 | 460 | 360 | 390 | 310 | 315 | 320 | 600 | 560 | 260 | 290 |
| Tensile strength Kg/cm | W | 7.5 | 7.0 | 8.0 | 18 | 17 | 12 | 18 | 6.5 | 6.8 | 7.0 | 17 | 16 | 7.0 | 6.5 |
| ASTM D 1682 | C | 5.0 | 5.0 | 6.0 | 15 | 14 | 11 | 14 | 5.5 | 5.7 | 6.0 | 16 | 15 | 5.0 | 5.5 |
| Elongation % | W | 80 | 85 | 75 | 15 | 14 | 55 | 15 | 80 | 78 | 75 | 15 | 16 | 75 | 80 |
| ASTM D 1682 | C | 110 | 115 | 120 | 20 | 18 | 100 | 20 | 110 | 115 | 120 | 20 | 18 | 115 | 110 |
| Tear Strength kg | W | 1.5 | 1.4 | 1.5 | 5.5 | 5.0 | 3.0 | 5.0 | 1.4 | 1.36 | 1.3 | 5.5 | 5.5 | 1.4 | 1.3 |
| (Elmendorf) | C | 0.8 | 0.9 | 0.7 | 5.0 | 4.5 | 2.5 | 4.0 | 0.7 | 0.75 | 0.8 | 5.0 | 4.5 | 0.8 | 0.7 |
| ASTM D 1424 | | | | | | | | | | | | | | | |
| Shrinkage % | W | 1.5 | 1.0 | 1.3 | 2.0 | 1.5 | 2.0 | 1.0 | 1.3 | 1.4 | 1.5 | 1.0 | 1.0 | 1.5 | 1.5 |
| AATCC 96 1967 | C | 1.0 | 0.5 | 0.8 | 1.5 | 1.5 | 1.8 | 1.0 | 0.8 | 0.76 | 0.7 | 0.6 | 0.5 | 1.0 | 0.8 |
| Air permeability lt/h | | 2500 | 2500 | 2400 | 1500 | 1800 | 2000 | 1500 | 1800 | 1800 | 1800 | 1500 | 1500 | 0 | 0 |
| ASTM D 737 | | | | | | | | | | | | | | | |
| Abrasion cycles/r | | 350 | 350 | 300 | 500 | 500 | 450 | 500 | 400 | 425 | 450 | 500 | 500 | 350 | 400 |
| ASTM D 1175 | | | | | | | | | | | | | | | |
| Flame retarding class RF 1 | | | 1 | | 1 | | | 1 | | | 1 | 1 | | | |

The base sheet according to the invention is suitable also for less demanding applications such as coupling to wallpaper (in this case the bonding agent is glue, and preferably vinyl glues), or coupling by glues or above disclosed thermobonding foams to natural or imitation leathers of poor quality with respect to the invention base sheet.

We claim:

1. A laminate material comprising:
   a) a base sheet comprising a polyester or polyamide microfiber felt of from about 0.05 to about 0.80 denier impregnated with a polyurethanic polymer, wherein said polyurethanic polymer has polyurethane and polyurea bonds and an average molecular weight corresponding to a polymer solution viscosity ranging from about 10,000 to about 50,000 centipoise when said polymer solution comprises 25% by weight in dimethyl formamide at a temperature of 20° C., wherein said base sheet ranges from about 50% to about 90% by weight of said felt and correspondingly from about 50% to about 10% by weight of said polyurethanic polymer, and wherein said base sheet has a final weight of from about 140 to about 400 g/m² and a density of from about 0.20 to about .40 gm/cm³; and
   b) a functional substrate attached to said base sheet.

2. The laminate material of claim 1, wherein said felt is selected from the group consisting of polyethylene terephthalate, polyamide 6, polyamide 6—6, or combinations thereof and is from about 0.05 to about 0.40 denier, and wherein said polyurethanic polymer has an average molecular weight corresponding to a polymer solution viscosity ranging from about 15,000 to about 28,000 centipoise when said polymer solution comprises 25% by weight in dimethylformamide at a temperature of 20° C.

3. The laminate material of claim 2, wherein said base sheet ranges from about 60% to about 75% by weight of said felt and correspondingly from about 40% to about 25% by weight of said polyurethanic polymer, and wherein said base sheet has a final weight of from about 160 to about 260 g/m² and a density of from about .20 to about .30 gm/cm³.

4. The laminate material of claims 2 or 3, wherein said polyurethanic polymer is the reaction product of 3-isocyanate methyl-3,5,5-trimethylcyclohexyl isocyanate, or of a diisocyanate of formula

OCN—R—CH₂—R—NCO wherein R is a benzene or cyclohexane group, having a mixture of polyester glycols and polyether glycols having an average molecular weight of from 1900 to 2100 wherein the resulting prepolymer is extended by reaction with a chain extender.

5. The laminate material of claim 4, wherein said chain extender is water.

6. The laminate material of claim 1, wherein said felt comprises of flame resistant polyester.

7. The laminate material of claim 6, wherein said flame resistant polyester comprises a copolymer of polyethylene terephthalate and a glycol of formula:

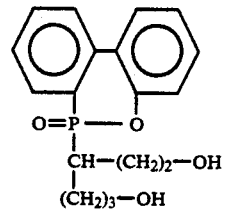

8. The laminate material of claim 1, wherein said functional substrate comprises a woven fabric having about 55 to about 70 parts of polyester fibers and about 30 to about 45 parts of cotton fibers.

9. The laminate material of claim 1, wherein said functional substrate comprises a knitted nylon fabric.

10. The laminate material of claim 1, wherein said functional substrate comprises a polyurethane foam layer of from about 2 to about 6 mm in thickness and a density of from about 18 to about 40 g/cm³.

11. The laminate material of claim 1, wherein said functional substrate comprises a woven fabric of flame resistant polyester.

12. The laminate material of claim 1, wherein said functional substrate comprises a flame retarded polyurethane foam layer of from about 2 to about 6 mm in thickness and a density of from about 18 to about 40 g/cm³.

13. The laminate material of claim 10, further comprising a thermobonding layer interposed between said base sheet and said functional substrate, wherein said thermobonding layer is selected from the group consisting of thermobonding films and thermobonding foams having less than 1.2 mm in thickness.

14. The laminate material of claim 8, further comprising an 8 to 10 mm thick polyurethane foam layer and a knitted nylon fabric attached to the laminate.

15. The laminate material of claim 8, further comprising a 2.5 to 3.5 mm thick polyurethane foam and a knitted polyethylene terephthalate fabric attached to the laminate.

16. The laminate material of claim 1, wherein said functional substrate comprises a waterproofing film.

17. The laminate material of claim 16, wherein said functional substrate comprises a woven fabric of polyester/cotton in a ratio of from about 70/30 to about 55/45 or a 100% flame retarded polyester.

18. The laminate material of claim 16, wherein said functional substrate comprises a polyurethane foam of from 2 to 6 mm in thickness.

19. The laminate material of claim 16, wherein said waterproofing film comprises a micropore polyurethane film.

20. The laminate material of claim 13, wherein said thermobonding layer comprises a natural or imitation leather substrate.

21. The laminate material of claim 1, wherein said functional substrate comprises wallpaper substrate.

22. A process for preparing an imitation leather laminated material, comprising the steps of: preparing a felt of polyester or polyamide microfibers of from 0.05 to 0.80 denier, preparing a solution of a polyurethane-polyurea polymer having an average molecular weight corresponding to a polymer solution viscosity within the range from 10,000 to 50,000 centipoise (cps) when the solution is 25% by weight in dimethylformamide at a temperature of 20° C., impregnating said felt with said polyurethane-polyurea to such an extent as to obtain after coagulating and drying steps a polyurethanic base sheet containing from 50 to 90% by weight of said felt and from 10 to 50% by weight of said polyurethane-polyurea polymer, the resulting base sheet having final weight within 140 to 450 g/m$^2$ and density within 0.20 to 0.40 g/cm$^3$, and bonding the polyurethanic base sheet thus obtained with a functional substrate comprising one or more substrate materials.

23. A process according to claim 22, wherein said microfibers are polyethylene terephthalate or polyamide 6 or polyamide 6—6 of from 0.05 to 0.4 denier, and said polyurethanic polymer has an average molecular weight corresponding to a polymer solution viscosity within the range from 15,000 to 28,000 centipoise (cps) when the solution is 25% by weight in dimethylformamide at a temperature of 20° C.

24. A process according to claim 23, wherein said microfiber felt is 60 to 75% by weight and said polyurethanic polymer is 40 to 25% of said base sheet, the said base sheet having final weight within 160 to 260 g/m$^2$ and density within 0.20 to 0.30 g/cm$^3$.

25. A process according to claim 22, wherein said polyurethane-polyurea polymer preparation comprises the steps of reacting 3-isocyanate methyl-3,5,5-trimethylcyclohexyl isocyanate, or a diisocyanate of formula

OCN—R—CH$_2$—R—NCO where R is a benzene or cyclohexane group, with a mixture of polyester glycols and polyester glycols having an average molecular weight of from 1900 to 2100 to form a prepolymer, and reacting the resulting prepolymer with a chain extender.

26. A process according to claim 25, wherein said prepolymer is reacted with water to obtain a polyurethane polyurea polymer.

27. A process according to claim 26, wherein the water is used according to a water/glycols molar ratio within 1.50 and 1.71 and the extension reaction with water is carried out at a temperature within 30° to 80° C.

28. A process according to claim 22, wherein said preparation step of cited microfiber felt comprises the step of coextruding a copolymer of polyethylene terephthalate and a glycol of formula

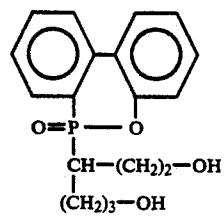

with a styrene polymer or copolymer having relative viscosity (n) 1.78±0.03, max. moisture 400 ppm, softening point 87° C., weight density 1.05, apparent density 0.65, rest angle 32.

29. A process according to claim 22, comprising the step of bonding a woven fabric functional substrate, wherein said woven fabric is comprising 55 to 70 parts of polyester fibers and 30 to 45 parts of cotton fibers, or a 100 parts flame retarded polyester.

30. A process according to claim 22, wherein said functional substrate is a knitted nylon or polyethylene terephthalate fabric.

31. A process according to claim 22, wherein said functional substrate is a polyurethane foam layer or a flame retarded polyurethane foam layer of from 2 to 6 mm thickness and having a density of from 18 to 40 g/cm$^3$.

32. A process according to claim 22, wherein said coupling step is carried out by means of a thermobonding layer selected from thermobonding films and thermobonding foams of less than 1.2 thickness.

33. A process according to claim 29 or 30, wherein said fabric is bonded to said polyurethanic base sheet by means of thermobonding polymer powders.

34. A process according to claim 30, wherein a polyurethane foam is bonded to said knitted fabric.

35. A process according to claim 29, wherein a polyurethane foam of 2 to 6 mm thickness is bonded to said woven fabric.

36. A process according to claim 22, comprising the step of bonding a waterproofing film substrate.

37. A process according to claim 22, wherein a natural or imitation leather substrate is bonded by glues to said base sheet.

38. A process according to claim 22, wherein a wallpaper substrate is bonded to said base sheet by means of polyvinyl based glues.

* * * * *